US010928482B2

(12) United States Patent
Studer et al.

(10) Patent No.: US 10,928,482 B2
(45) Date of Patent: Feb. 23, 2021

(54) MONITORING AND/OR RECORDING A POSITION OF A TOOL IN AN ELEVATOR SHAFT

(71) Applicant: Inventio AG, Hergiswil (CH)

(72) Inventors: Christian Studer, Kriens (CH); Philipp Zimmerli, Harkingen (CH); Martin Kusserow, Lucerne (CH)

(73) Assignee: INVENTIOAG, Hergiswil (CH)

( * ) Notice: Subject to any disclaimer, the term of this patent is extended or adjusted under 35 U.S.C. 154(b) by 449 days.

(21) Appl. No.: 15/779,569

(22) PCT Filed: Dec. 1, 2016

(86) PCT No.: PCT/EP2016/079503
§ 371 (c)(1),
(2) Date: May 29, 2018

(87) PCT Pub. No.: WO2017/093438
PCT Pub. Date: Jun. 8, 2017

(65) Prior Publication Data
US 2020/0363491 A1 Nov. 19, 2020

(30) Foreign Application Priority Data
Dec. 2, 2015 (EP) .................................. 15197608

(51) Int. Cl.
*G01S 5/02* (2010.01)
*B66B 1/34* (2006.01)
(Continued)

(52) U.S. Cl.
CPC .......... *G01S 5/0264* (2020.05); *B66B 1/3492* (2013.01); *B66B 5/0087* (2013.01);
(Continued)

(58) Field of Classification Search
CPC ....... B66B 19/00; B66B 19/02; B66B 1/3492; B66B 5/0087; G01S 5/0252;
(Continued)

(56) References Cited

U.S. PATENT DOCUMENTS

2010/0057243 A1   3/2010  Stencel et al.
2014/0320121 A1*  10/2014 Perttunen ............... G01O 21/08
                                                    324/244

(Continued)

FOREIGN PATENT DOCUMENTS

DE   102012110467 A1   5/2013
DE   102012219871 A1   4/2014
(Continued)

*Primary Examiner* — Bernarr E Gregory
*Assistant Examiner* — Fred H Mull
(74) *Attorney, Agent, or Firm* — William J. Clemens; Shumaker, Loop & Kendrick, LLP

(57) ABSTRACT

A system for monitoring and/or recording a position of a tool in an elevator shaft includes a position measuring system for measuring a position of the tool relative to an elevator car; a height measuring system for measuring a height of the elevator car in the elevator shaft; and an evaluation system designed to receive measured data from the position measuring system and the elevation measuring system and to determine a position of the tool relative to the elevator shaft from the measured data.

17 Claims, 2 Drawing Sheets

(51) Int. Cl.
  *B66B 5/00* (2006.01)
  *B66B 19/00* (2006.01)
  *G01S 5/16* (2006.01)
  *G01C 5/06* (2006.01)
  *H04N 5/225* (2006.01)
  *G06K 9/00* (2006.01)
  *G06T 7/70* (2017.01)
  *G01S 5/30* (2006.01)

(52) U.S. Cl.
  CPC ............... *B66B 19/00* (2013.01); *G01C 5/06* (2013.01); *G01S 5/16* (2013.01); *G01S 5/30* (2013.01); *G06K 9/00664* (2013.01); *G06T 7/70* (2017.01); *H04N 5/2253* (2013.01); *B66B 19/002* (2013.01)

(58) Field of Classification Search
  CPC .......... G01S 5/02521; G01S 5/14; G01S 5/16; G01S 5/18; G01S 5/30; G01S 5/0264; H04N 5/2253; G01C 5/06; G01C 21/08; G06T 7/70; G06K 9/00664
  See application file for complete search history.

(56) References Cited

U.S. PATENT DOCUMENTS

2016/0311648 A1* 10/2016 Vaarala .................. B66B 19/00
2016/0311657 A1* 10/2016 Kilpelainen ............ B66B 19/00

FOREIGN PATENT DOCUMENTS

EP       1881340  A2    1/2008
EP       2138920  A2   12/2009

\* cited by examiner

12 SENSOR UNIT  14 EVALUATION ELECTRONICS  16 SIGNAL STRENGTH SENSOR
18 INERTIAL MEASUREMENT UNIT  20 HEIGHT MEASURING DEVICE  22 CURRENT SENSOR
24 ACCELERATION SENSOR  26 GYROSCOPE  28 CAMERA  38 EVALUATION UNIT
40 CAR HEIGHT MEASURING DEVICE  44 FURTHER HEIGHT MEASURING DEVICE

MONITORING AND/OR RECORDING A POSITION OF A TOOL IN AN ELEVATOR SHAFT

FIELD

The present invention relates to a system and a method for monitoring and/or recording a position of a tool in an elevator shaft.

BACKGROUND

When assembling and servicing an elevator system, it may be necessary to record the work steps carried out by an installer. This may be assisted by an electronic position determining system for example, which system monitors the position of a tool used by the installer, for example.

In general, when assembling large industrial facilities, location and position determining systems are used, by means of which the correct installation of components in the facility can be monitored. Systems of this kind can identify, for example, whether a specific component of the facility has been screwed to the facility at the correct point.

When assembling an elevator, the rail arrangement of the elevator is usually assembled upwards, starting at the lowest floor. In this case, the installer usually stands on the roof of the elevator car. The elevator car is installed in the elevator shaft immediately after the lowest rail arrangement has been assembled, and is moved upwards in order to install the rail arrangement in the higher floors.

The geometry of the elevator shaft, the elevator car that entirely blocks the elevator shaft in the height direction, and the large number of metal components (such as the rail arrangement) fastened at the sides in the elevator shaft can make it harder or even impossible to use conventional locating and positioning systems.

US 2010/0057243 A1 relates to a method for optimizing an assembly process, in which a tool is used, the position of which can be determined by means of gyroscopes and acceleration sensors.

DE 2012 219 871 A1 relates to a method for recording screw connections, in which method a screw position is located and recorded using image information.

EP 2 138 920 A2 relates to a system and a method for locating and recording manufacturing steps for an aircraft. In this method, a position at which a manufacturing step has been carried out is detected and is displayed in an environment model.

EP 1 881 340 A2 relates to a system and a method for locating and recording a tool. In this method, free-field position finding is carried out in order to detect the absolute position of the tool, and relative position finding is carried out, in order to determine the relative position of the tool, by following the movement of the tool relative to a known reference position. The result of the determination of the relative position is combined with the result of the free-field position finding, in order to determine the position of the tool.

It may be necessary, during installation, assembly and servicing of an elevator, to automatically record work steps and/or to precisely identify, in a simple manner, a position of a tool in the elevator shaft.

SUMMARY

Possible features and advantages of embodiments of the invention may be considered, inter alia and without limiting the invention, to be dependent upon the concepts and findings described below.

One aspect of the invention relates to a monitoring and recording system for monitoring and/or recording a position of a tool in an elevator shaft. The elevator shaft may be an elongate vertical shaft in a building, in which an elevator system can be installed. An elevator system may comprise an elevator car that can be moved vertically on the walls of the elevator shaft, along a rail arrangement. The elevator car or the elevator may be designed to convey people and/or material.

The tool may be designed as an electrically, pneumatically or hydraulically driven tool, for example as an electric screwdriver. It is also possible, however, for the tool to be designed as a manually actuatable tool, for example in the form of a torque wrench.

According to an embodiment of the invention, the system comprises a position measuring system for measuring a position of the tool relative to an elevator car; a height measuring system for measuring a height of the elevator car in the elevator shaft; and an evaluation system designed to receive measured data from the position measuring system and the height measuring system and to determine therefrom a position of the tool relative to the elevator shaft.

The position measuring system may comprise one or more sensors, and also associated evaluation electronics. Sensors of the position measuring system and the associated evaluation electronics thereof can be attached to the tool, to the elevator car and/or in the elevator shaft or can be integrated therein. A three-dimensional position of the tool (that can be specified by a three-dimensional vector for example) can be identified from the measured data of the position measuring system. This relative position of the tool can be specified relative to a reference point of the elevator car (for example the center or a corner of the car roof of the elevator car).

The height measuring system may comprise a plurality of height measuring devices or sensors and the associated evaluation electronics thereof. These height measuring devices and the associated evaluation electronics thereof can be attached to the tool, to the elevator car and/or in the elevator shaft or can be integrated therein. A vertical spacing (a height) between the reference point of the elevator car and a reference level in the elevator shaft (for example the bottom or the top of the elevator shaft) can be identified from the measured data of the height measuring system.

The evaluation system may comprise evaluation electronics of the sensors of the position measuring system and/or of the height measuring system, and/or may comprise a further evaluation unit that is connected to the sensors or to the evaluation electronics thereof by means of data communication links. For example, the evaluation system and/or the evaluation unit may be a computer and a mobile device that an installer carries with him for example. It is also possible for the evaluation system and/or the evaluation unit to be integrated in the tool.

The evaluation system or the evaluation unit receives, from the different sensors, the measured data thereof, which data may have already been processed by any evaluation electronics, and then calculates, from these data, the position of the tool relative to the reference level or a reference point of the elevator shaft. For example, the vertical spacing identified by the height measuring system can be added to the three-dimensional vector of the relative position of the tool with respect to the elevator car.

The monitoring and recording system may be used to monitor the positions in the elevator at which construction components of the elevator system are worked by the tool. For example, the tool may be an electrical screwdriver and/or the monitoring and recording system may be used to record the positions at which screws have been tightened by the electric screwdriver.

A further aspect of the invention relates to a method for monitoring and/or recording a position of a tool in an elevator shaft. This method may be implemented automatically by the system for monitoring and/or recording a position of a tool. For example, the evaluation system may comprise a computer and/or an embedded system, on which software is executed that is capable of implementing the method. It is understood that features of the method may also be features of the system and vice versa.

According to an embodiment of the invention, the method comprises: measuring a position of the tool relative to an elevator car using a position measuring system; measuring a height of the elevator car in the elevator shaft using a height measuring system; and determining a position of the tool relative to the elevator shaft on the basis of the mentioned measured data of the position measuring system and of the height measuring system using an evaluation system. In other words, the evaluation system can retrieve measured data from the sensors of the position measuring system and of the height measuring system, convert said measured data into the relative position of the tool with respect to the elevator car and the height of the elevator car relative to a reference level to the elevator shaft, and calculate, from the relative position and the height (for example by addition), the absolute position of the tool in the elevator shaft.

According to an embodiment of the invention, the position measuring system comprises at least three, four or more signal transmitters that are attached to the elevator car at different positions, and a signal strength sensor that is attached to the tool. Said signal transmitters may be radio transmitters in the form of Bluetooth Low-Energy transmitters for example, which are attached to the corners of the car roof of the elevator car. The signal strength sensor may in this case be a Bluetooth receiver which is integrated in the tool. The evaluation system may be designed to determine the position of the tool relative to the elevator car from the signal strengths of the signal transmitters measured by the signal strength sensor. It is also possible for a signal transmitter to be arranged on the tool and for a corresponding signal strength sensor to be arranged on the elevator car.

According to an embodiment of the invention, the signal transmitters are attached to a car roof of the elevator car. The signal transmitters may be attached to three or four corners of the car roof for example.

According to an embodiment of the invention, signals of the signal transmitter that are received by the signal strength sensor are radio signals, ultrasound signals, Bluetooth signals and/or infrared signals. The signals of different signal transmitters may be differently modulated and/or may have different frequencies, such that the signal strength sensor can separate said signals from one another. The tool, such as an electric screwdriver, may be provided with a sensor unit for example, which unit comprises a RSSI (received signal strength indicator) measuring device as the signal strength sensor, which measuring device can identify the signal strengths of transmitters of a wireless communication network for example. In other words, transceivers or transmitters of a wireless communication network (Bluetooth, infrared, etc.) may be used as signal transmitters. The sensor unit of the tool can measure the RSSI values of the transmitters on the car roof and use said values to calculate the movement of the tool relative to the car roof.

As an alternative to the described method for measuring the position of the tool relative to the elevator car, a method based on ultrasound may also be used. For this purpose, for example, an ultrasonic transmitter may be arranged on the tool and one ultrasonic receiver may be arranged in each case at least three defined points on the elevator car. In each case, the spacing between the transmitter and the receivers, and thus the position of the transmitter relative to the receivers and thus also relative to the elevator car, can be determined from the delay times of the ultrasonic waves from the transmitter to the receivers.

According to an embodiment of the invention, the position measuring system comprises an inertial measurement unit that is designed to determine an acceleration and/or a spatial orientation of the tool relative to the elevator car. The inertial measurement unit can be integrated in the tool for example. An acceleration and/or a spatial orientation can be described using a three-dimensional vector. The inertial measurement unit, which may be attached to the tool or integrated in the tool, can determine the spatial orientation and/or the acceleration of the tool in the x-, y- and z-direction and/or can determine an angle of the tool relative to the horizontal. In particular, the spatial orientation and/or the angle make it possible to detect how the tool is positioned relative to the walls of the elevator shaft (tool is directed towards the front wall, the rear wall, the left-hand or right-hand side wall, the bottom surface or the top surface of the elevator shaft).

The inertial measurement unit may comprise an acceleration sensor for measuring accelerations and/or a gyroscope for measuring the spatial orientation. The inertial measurement unit may further comprise a magnetic field sensor, by means of which a location or orientation change in a homogenous magnetic field (for example the earth's magnetic field) can also be identified.

The evaluation system may be designed to determine a spatial orientation of the tool relative to the elevator shaft, on the basis of the position of the tool relative to the elevator shaft and the acceleration and/or the spatial orientation of the tool relative to the elevator car. If the evaluation system compares the absolute position of the tool in the elevator shaft with a three-dimensional model of the elevator system in the elevator shaft, the evaluation system can use the spatial orientation of the tool to determine towards which construction component the tool is currently directed.

Furthermore, the acceleration of the tool may be used to improve the determination of the relative position of the tool.

According to an embodiment of the invention, the height measuring system comprises a car height measuring device that is attached to the elevator car. The car height measuring device may be attached to the car roof of the elevator car. The vertical spacing between the car height measuring device and the signal transmitters of the position measuring system may be fixed and may be used by the evaluation system in order to determine the position of the tool relative to the elevator car.

According to an embodiment of the invention, the height measuring system comprises a shaft height measuring device that is attached to the elevator shaft, for example to a wall, the bottom or the top of the elevator shaft. The shaft height measuring device may be attached at the highest floor of the elevator shaft because, in this case, there is always a clear line of sight to an evaluation unit of the evaluation system on the car roof.

In total, two height measuring devices may be attached, in the elevator shaft, at the highest floor, and to the car roof of the elevator car.

According to an embodiment of the invention, the height measuring system comprises a tool height measuring device that is attached to the tool. The tool height measuring device may be integrated in the tool and/or may be a component of the inertial measurement unit. The calculation of the absolute position of the tool in the elevator shaft can be assisted or improved using the measured data of the tool height measuring device.

According to an embodiment of the invention, the car height measuring device, the shaft height measuring device and/or the tool height measuring device each comprise an air pressure sensor. When measuring the relative height, it is possible to achieve precision to within a few dm if temperature and/or air humidity are also taken into account. It is also possible, however, for the car height measuring device, the shaft height measuring device and/or the tool height measuring device to be based on laser, radar and/or sonar distance measurements. For example, the car height measuring device may determine a distance between the car roof and the top of the elevator shaft.

It is also possible to identify the height of the tool using the tool height measuring device and a shaft height measuring device as a reference height measuring device that may be attached close to the highest floor.

The height of the elevator car may also be determined using other known position measuring systems, such as an absolute position measuring system, as is used in the subsequent operation of the elevator system.

According to an embodiment of the invention, the system comprises a camera that is attached to the tool. Said camera, which can generally capture images of construction components of the elevator system towards which the tool is directed and/or that are being worked by the tool, can send images and/or films to the evaluation system via a data communication link.

The camera attached to the tool can further assist or improve the process of locating the tool. For example, the camera images can be evaluated by the evaluation system and it is possible to identify, on the basis of a construction plan or a three-dimensional model of the elevator system, which construction component of the elevator system is currently within the sight of the camera (for example, it is possible to identify whether the camera or the tool is directed towards a screw, towards the left-hand or right-hand screw of a plurality of screws, etc.).

The evaluation system may be designed to evaluate an image of the camera and to recognize a construction component of an elevator system towards which the camera is directed. For example, the evaluation system can identify that the construction component (for example a screw) is depicted in a specific position within the image.

Furthermore, the evaluation system may be designed to identify a construction component in a three-dimensional elevator model, on the basis of the position and/or a spatial orientation of the tool relative to the elevator shaft and the recognized construction component. For example, a pre-defined volume in front of the tool (such as a square and/or cube having side lengths of less than 10 cm for example) may be cut out of the three-dimensional elevator model, and the specific construction components (such as screws) may be sought in said volume.

Furthermore, the evaluation system may be designed to determine a corrected position and/or corrected spatial orientation of the tool from the identified construction component of the model. It may be assumed, for example, that a construction component worked by the tool is located exactly at a tip (a reference point) of the tool, even if said component were found only at the edge in the above-mentioned pre-defined volume.

According to an embodiment of the invention, the system comprises a current sensor that is connected to a power supply of the tool. The evaluation system may be designed to determine, from measured data of the current sensor, when and/or in what way the tool has been activated. The sensor unit on the tool may also be designed to identify the present power consumption of the tool (for example from a power supply, such as an accumulator integrated in the tool). This information can be used to determine when the tool is activated. Measurements of the current may also be used to identify how firmly a screw has been tightened.

It is also possible for the tool to independently detect different variables and transfer said variables to the evaluation system. If the tool is designed as an electric screwdriver for example, it may for example detect a number of rotations, an angular position, a torque and a preload of the screw when a screw has finished being screwed in, and transfer said data to the evaluation system.

According to an embodiment of the invention, the evaluation system is designed to record, for example in a file and/or database, the position and/or a spatial orientation of the tool relative to the elevator shaft at which the tool has been activated. For example, an image captured by the camera at this position may also be stored in the file. Measured values of the current sensor that were recorded at this position may also be stored in said file. The system can assist an installer or serviceman when filling in records, and thus result in time-saving during servicing or assembly. The system can also be used by an inspector during acceptance of the elevator, and in the process also result in considerable time-saving during the acceptance.

According to an embodiment of the invention, the evaluation system is designed to compare a three-dimensional elevator model with recorded positions of the tool and to identify whether construction components at which the tool is to be activated should not be worked. For example, it is possible to electronically identify whether tightening of specific screws has been forgotten. Alternatively, or in addition, the positions identified by the system, at which positions the construction components were worked, can be shown together with a construction plan or a three-dimensional model of the elevator shaft and/or of the elevator system and/or compared with the three-dimensional model, for example visually.

It should be noted that some of the possible features and advantages of the invention are described here with reference to different embodiments. A person skilled in the art shall recognize that the features may be combined, adapted, or exchanged as appropriate in order to arrive at other embodiments of the invention.

Embodiments of the invention will be described below with reference to the accompanying drawings, neither the drawings nor the description being intended to be interpreted as limiting the invention.

The drawings are merely schematic and not true to scale. Like reference signs refer in different drawings to like or analogous features.

DETAILED DESCRIPTION

Figure 1:
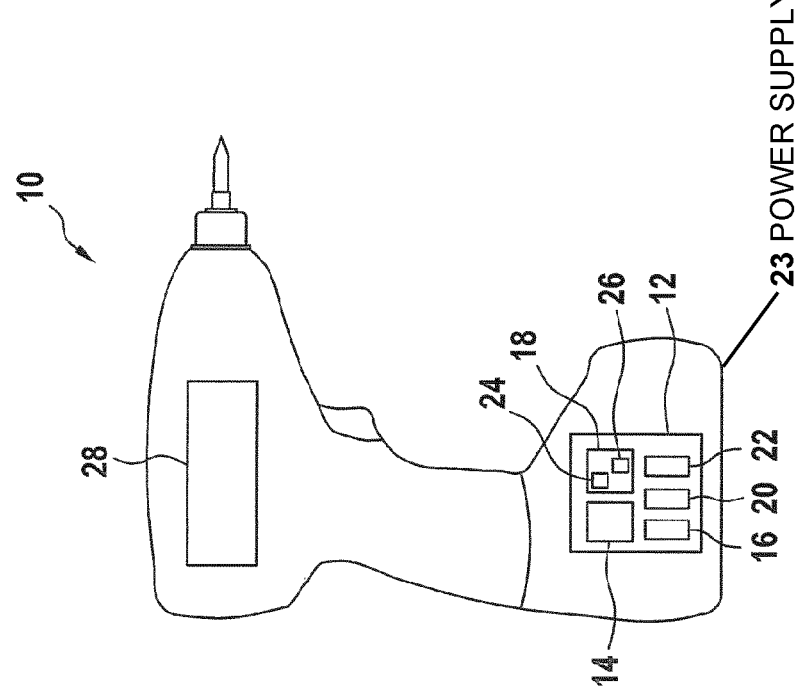
FIG. 1 schematically shows a tool for a monitoring and recording system according to an embodiment of the invention.

FIG. 1 shows a tool 10 in the form of an electric screwdriver, by means of which screws for fastening a rail arrangement of an elevator system to the walls of an elevator shaft, for example, can be tightened.

The tool 10 comprises a sensor unit 12 that is integrated in the tool and that comprises, in addition to evaluation electronics 14, a signal strength sensor 16, an inertial measurement unit 18, a height measuring device 20 and a current sensor 22. The height measuring device 20 and/or the current sensor 22 are optional.

The signal strength sensor 14 is designed to receive signals (such as radio, infrared or ultrasound signals) from a signal transmitter 42 (see FIG. 2) and to identify a signal strength of said signal. The evaluation electronics 14 can determine a distance of the tool 10 from the signal transmitters, and therefrom a position of the tool 10 relative to said signal transmitters, at different locations.

The inertial measurement unit 18 comprises an acceleration sensor 24 and a gyroscope 26. The acceleration sensor 24 can generate acceleration measured data of the tool 10. The gyroscope 26 is used to identify the spatial orientation of the tool 10. Furthermore, the inertial measurement unit 18 may comprise a magnetic field sensor, by means of which a spatial orientation of the tool 10 can be identified using the earth's magnetic field.

The height measuring device 20, which may be based on air pressure measurements for example, can determine an absolute height of the tool 10. A height of the tool 10 relative to a reference point, for example in an elevator shaft, can be determined by means of comparison with an absolute height of the reference point.

The current sensor 22 is connected to a power supply 23 of the tool 10 (for example an accumulator) and can identify whether and/or for how long the tool 10 is activated (power on/off). By measuring the current strength it is also possible to identify, for example, how firmly a screw has been tightened by the tool 10.

The tool 10 further comprises an integrated camera 28, by means of which a working region in front of the camera 28 can be monitored and/or by means of which images of said working region can be captured.

Alternatively, the sensor unit 12 and/or the camera 28 may be attached only to the tool 10 and/or may be releasable from the tool 10 for example.

Figure 2:
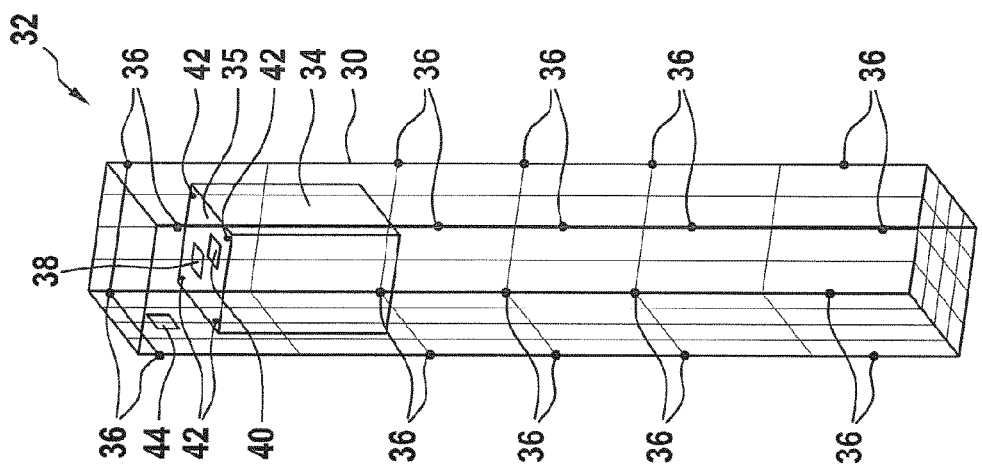
FIG. 2 schematically shows an elevator shaft comprising sensors for a monitoring and recording system according to an embodiment of the invention.

FIG. 2 shows an elevator shaft 30, in which an elevator system 32 is installed (during assembly, at least in part). The elevator system 32 comprises an elevator car 34 which can be moved up and down in the elevator shaft 30. During servicing and/or assembly of the elevator system 32, an installer may be on the car roof 35 of the elevator car 34, and in this case may hold the tool 10 in his hand and work construction components 36 of the elevator system 32. Screws of a rail arrangement are shown as construction components 36 in FIG. 2 by way of example.

An evaluation unit 38 (for example a laptop or a mobile device, smartphone, tablet computer), a car height measuring device 40 and four signal transmitters 42 attached to the corners of the car roof 35 are located on the car roof 35 of the elevator car 34. A further height measuring device 44 is attached to a wall of the elevator shaft 30 at the height of the highest floor. Evaluation electronics may be integrated in the height measuring devices 40, 44.

It may also be possible for an evaluation unit 52 (see FIG. 3) to be integrated in the sensor unit 12 of the tool as an electronic component.

The evaluation unit 38 is then designed to receive measured data from the tool 10 or from the sensor unit 12 thereof and the height measuring devices 40, 44 and to further process said data. This may occur via a wireless data communication link for example. The evaluation electronics 14 of the tool 10 can receive measured data or images from the individual sensors or sensor units 16, 18, 20, 22, 24, 26 of the tool and from the camera 28 of the tool, and transmit said measured data to the evaluation unit 38 via the data communication link.

The evaluation unit 38 can also actuate the signal transmitters 42 and trigger said transmitters to emit a signal. The signal transmitters 42 and/or the height measuring device 40 may be connected to the evaluation unit 38 via a wired data communication link.

The signal transmitters 42 can transmit signals, the strength of which can be measured by the signal strength sensor 16. Either the evaluation electronics 14 of the tool or the evaluation unit 38 can determine a position of the tool 10 relative to the car roof 35 from the different signal strengths.

It is possible for the signals of the signal transmitter 42 to be data communication signals, for example based on Bluetooth, by means of which, too, a data communication link to the tool 10 or the evaluation electronics 12 thereof, to the height measuring device 40 and/or to the height measuring device 44 can be established.

Figure 3:
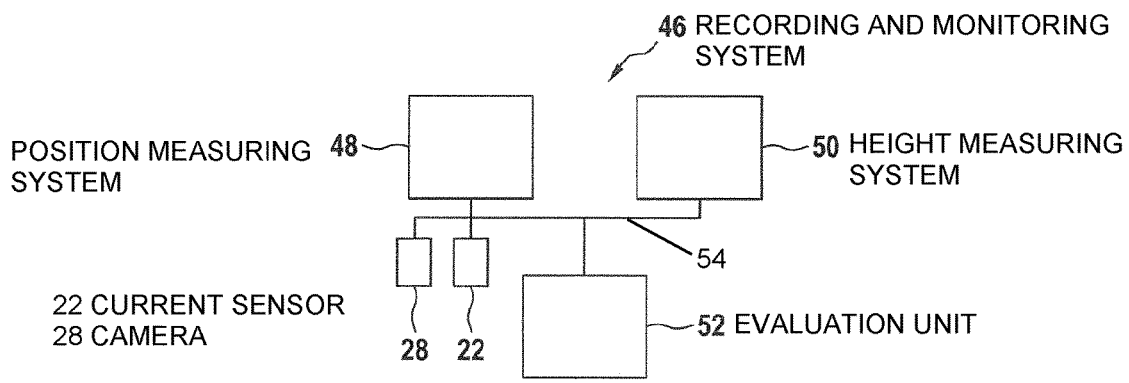
FIG. 3 schematically shows a monitoring and recording system according to an embodiment of the invention.

FIG. 3 schematically shows a recording and monitoring system 46 that is formed of the sensors, height measuring devices, evaluation electronics, the evaluation unit 38 etc. shown in FIGS. 1 and 2.

The system 46 comprises a position measuring system 48 that may comprise the signal strength sensor 16 on the tool 10, the signal transmitter 42 on the car roof 35, the inertial measurement unit 18 of the tool 10, the acceleration sensor 24 of the tool 10, the gyroscope 26 of the tool 10 and a magnetic field sensor of the tool. The system 46 further comprises a height measuring system 50 that may comprise the tool height measuring device 20, the car height measuring device 40 and/or the elevator shaft height measuring device 44.

The evaluation system 52 of the overall system 46 comprises the evaluation unit 38 and optionally any evaluation electronics of the tool 10 or of the height measuring devices 40, 44 that may be present.

The system 46 may also comprise the current sensor 22 and/or the camera 28 of the tool 10.

As shown in FIG. 3, the components of the system 46 may all be directly or indirectly interconnected by means of a data communication link 54.

Figure 4:
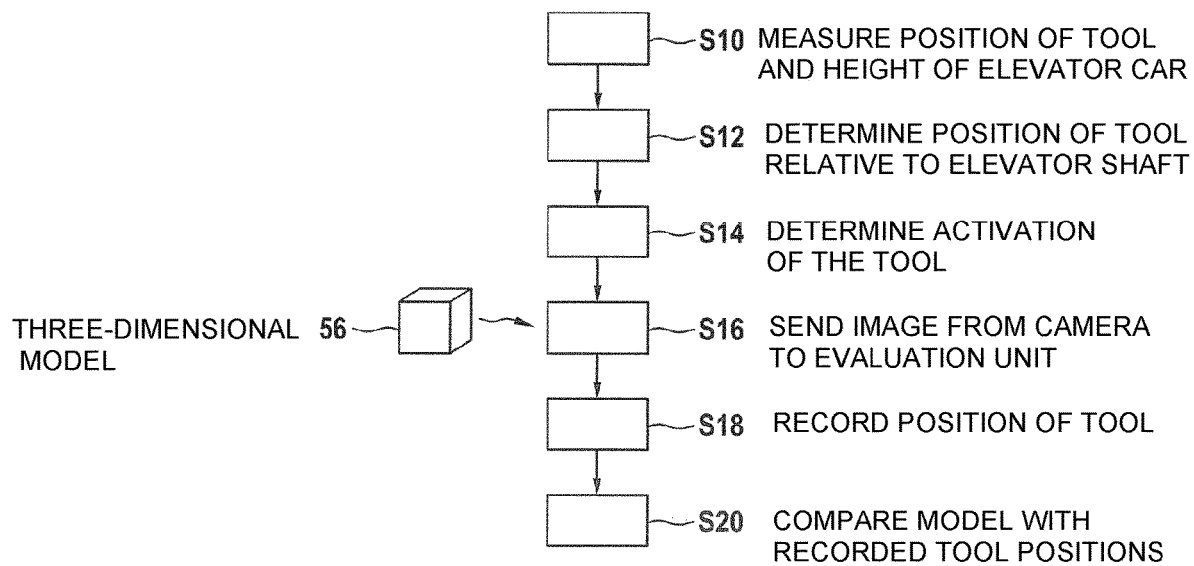
FIG. 4 is a flow diagram of a method for monitoring and/or recording a position of a tool in an elevator shaft according to an embodiment of the invention.

FIG. 4 shows a method that can be implemented automatically by the system 46.

In step S10, a position and, optionally, a spatial orientation, of the tool 10 relative to the elevator car 34 is measured using the position measuring system 48, and a height of the elevator car 34 in the elevator shaft 30 is measured using the height measuring system 50.

Signal strengths of the signal transmitter 42 are measured using the signal strength sensor 16, and the position of the tool 10 relative to the elevator car 34 is determined on the basis thereof. The position can in particular be calculated as a three-dimensional position or as a three-dimensional vector, i.e. as a number triplet.

Furthermore, a further position of the tool 10 relative to a previous tool position can also be identified from the measured data of the acceleration sensor 24. The position of the tool 10 can be used, together with the position identified on the basis of the signal strength sensor 16, to calculate a position of the tool in a manner having a reduced measuring error (for example by means of averaging).

A spatial orientation of the tool 10 can be measured using the gyroscope 26 and/or a magnetic field sensor for example. Said spatial orientation may comprise an angle to the horizontal (pitch angle) and/or an angular displacement relative to the vertical (yaw angle).

The height of the elevator car 34 in the elevator shaft 30 can be determined using the height measuring devices 40, 44. The two height measuring devices 40, 44 may each comprise an air pressure sensor and can determine a height relative to sea level. The height of the car roof 35 above the bottom of the elevator shaft 30 can be determined from the difference between the values of the elevator shaft height measuring device 44 and of the car height measuring device 40 (for example by adding a known offset).

It is also possible, however, for the car height measuring device 40 to be designed as a radar or lidar telemeter and to be able to identify a spacing from the top of the elevator shaft. The height of the car roof 35 above the bottom of the elevator shaft 30 can be determined from said spacing (for example by adding the known height of the elevator shaft 30).

The height measuring device 20 on the tool 10 may also comprise an air pressure sensor. The difference between the values of the tool height measuring device 20 and the car height measuring device 40 can be used for correcting/improving the position of the tool 10 relative to the elevator car 34 for example.

In step S12, a position and, optionally, a spatial orientation, of the tool 10 relative to the elevator shaft 30 is determined on the basis of the measured data. For example, the evaluation unit 38 may receive and also further evaluate all the measured data provided by the sensors.

The height of the car roof 35 above the shaft bottom, for example, can be added to the position relative to the car roof 35. A spatial (translational) offset of the coordinate system with respect to the elevator car 34 and with respect to the elevator shaft 30 can also be added here. For example, the coordinate system of the car may be determined by the center of the car roof 35, while the coordinate system of the elevator shaft is determined by a bottom corner of the elevator shaft.

It is equally possible for an angular offset to be added to the spatial orientation of the tool, in order to determine a spatial orientation of the tool 10 relative to the elevator shaft 30.

In step S14, it is determined, from measured data of the current sensor 22, when and/or in what way the tool 10 has been activated. For example, the current sensor 22 can identify when the installer has pressed a switch of the tool 10. It is also possible to identify, from the strength of the current, how firmly a screw has been tightened for example. In addition, the time point and the duration of the activation can be determined, for example by means of a clock of the evaluation unit 38.

Overall, the evaluation system 52 can identify a position and, optionally, the spatial orientation, of the tool 10 in the elevator shaft 30 at which the tool has been activated (and in addition the time point and/or the duration of the activation for example).

In step S16, an image of the camera 28 is sent from the tool 10 to the evaluation unit, for example on the basis of an activation of the tool 10. Said image can be stored, together with the position determined upon activation, and/or can be further evaluated by the evaluation unit 38 by means of image data processing.

For example, the evaluation unit 38 can recognize whether a construction component 36 of the elevator system 32, towards which the camera 28 is directed, can be seen in the image. In addition, the evaluation unit 38 can also recognize a location and/or an orientation of the construction component 36 and compare this with the identified position of the tool 10.

In this case, the evaluation unit 38 can identify the position of said construction component 36 on the basis of the position and/or the orientation of the tool 10 in the elevator shaft 30. It can be assumed, for example, that the construction component 36 is located at a specific position in the coordinate system of the tool 10. Said position, together with the position and/or the orientation of the tool 10, can be converted into a position of the construction component 36 in the elevator shaft 30.

It is also possible, however, for it to simply be assumed (without evaluating image data) that a construction component 36 is worked when the tool 10 is activated, and the position of the construction component 36 in the elevator shaft 30 is then determined as just described.

The evaluation unit 38 can then identify, in a three-dimensional model 56 (for example on the basis of a construction plan) of the elevator system 32, a corresponding construction component 36 in the model, on the basis of the position and/or of a spatial orientation of the tool 10 relative to the elevator shaft 30 and the recognized construction component 36 or the position of the construction component 36 in the elevator shaft 30. For example, the construction component 36 can be sought in a volume that is defined in the coordinate system of the tool 10.

The evaluation system 52 can thus establish a correlation between a real worked construction component 36 and a construction component in the model 56.

In step S18, the evaluation system 52 can record, in a file, the position and/or a spatial orientation of the tool 10 relative to the elevator shaft 30 at which the tool 10 has been activated. Further information, such as a construction component 36 found at the position in the model 56, the activation time point, the activation duration, a camera image of the camera 28 acquired at said time point, etc. can also be stored in said file, together with the position.

After the installer has finished his work, in a step S20, the evaluation system 52 can compare the three-dimensional elevator model 56 with the recorded positions of the tool 10 and can identify if construction components 36 at which the tool 10 should be activated were not activated. In this way, the evaluation system 52 can determine, and can optionally also visually show in the model 56, for example on a screen of the evaluation unit 38, construction components 36 that have not been worked but which should be worked. In this way, the installer is provided with automatic assistance when monitoring his work and/or warnings about possible deficiencies in assembly or servicing.

In conclusion, it should be noted that terms like "having," "comprising", etc. do not exclude any other elements or steps, and terms like "a" or "an" do not exclude a plurality. Furthermore, it is noted that features or steps that have been described with reference to one of the aforementioned embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A system for monitoring and/or recording a position of a tool in an elevator shaft, the system comprising:
a position measuring system for measuring a position of the tool relative to an elevator car in the elevator shaft and generating measured position data;
a height measuring system for measuring a height of the elevator car in the elevator shaft and generating measured height data; and
an evaluation system receiving the measured position data from the position measuring system and the measured height data from the height measuring system and determining from the measured position and height data a position of the tool relative to the elevator shaft to be at least one of monitored and recorded.

2. The system according to claim 1 wherein the position measuring system includes at least three signal transmitters that are attached to the elevator car at different positions, and a signal strength sensor that is attached to the tool, and wherein the evaluation system determines the position of the tool relative to the elevator car from signal strengths of signals from the signal transmitters measured by the signal strength sensor.

3. The system according to claim 2 wherein the signal transmitters are attached to a car roof of the elevator car.

4. The system according to claim 2 wherein the signals from the signal transmitters that are measured by the signal strength sensor are at least one of radio signals ultrasound signals, Bluetooth signals and infrared signals.

5. The system according to claim 1 wherein the position measuring system includes an inertial measurement unit that determines at least one of an acceleration and a spatial orientation of the tool, and wherein the evaluation system determines a spatial orientation of the tool relative to the elevator shaft based on the position of the tool relative to the elevator shaft and at least one of the acceleration and the spatial orientation of the tool relative to the elevator car.

6. The system according to claim 5 wherein the inertial measurement unit includes at least one of an acceleration sensor and a gyroscope.

7. The system according to claim 1 wherein the height measuring system includes at least one of: a car height measuring device that is attached to the elevator car; a shaft height measuring device that is attached to the elevator shaft; and
a tool height measuring device that is attached to the tool.

8. The system according to claim 7 wherein at least one of the car height measuring device, the shaft height measuring device and the tool height measuring device includes an air pressure sensor.

9. The system according to claim 1 including a camera on the tool, wherein the evaluation system evaluates an image generated by the camera and recognizes in the image a construction component of an elevator system towards which the camera is directed.

10. The system according to claim 9 wherein the evaluation system identifies a construction component in a three-dimensional elevator model based on at least one of a position and a spatial orientation of the tool relative to the elevator shaft and the recognized construction component.

11. The system according to claim 10 wherein the evaluation system determines at least one of a corrected position and a corrected spatial orientation of the tool from the recognized construction component in the elevator model.

12. The system according to claim 1 including a current sensor connected to a power supply of the tool, wherein the evaluation system determines based on measured data from the current sensor at least one of when and in what way the tool has been activated.

13. The system according to claim 1 wherein the evaluation system records at least one of the position and a spatial orientation of the tool relative to the elevator shaft at which the tool has been activated.

14. The system according to claim 1 wherein the evaluation system compares a three-dimensional elevator model with recorded positions of the tool and identifies whether the tool was activated at construction components at which the tool should be activated.

15. The system according to claim 1 wherein the tool is an electric screwdriver.

16. The system according to claim 15 wherein construction components of an elevator system are screws, and the evaluation system records at least one of positions of the screws in the elevator shaft and an activation of the screws by the tool.

17. A method for monitoring and/or recording a position of a tool in an elevator shaft, the method comprising the steps of:
measuring a position of the tool relative to an elevator car in the elevator shaft using a position measuring system;
measuring a height of the elevator car in the elevator shaft using a height measuring system; and
determining a position of the tool relative to the elevator shaft based on measured position data from the position measuring system and measured height data from the height measuring system using an evaluation system.

* * * * *